June 10, 1930.	C. A. BOWEN	1,763,500
SAW
Filed Oct. 31, 1927	2 Sheets-Sheet 1
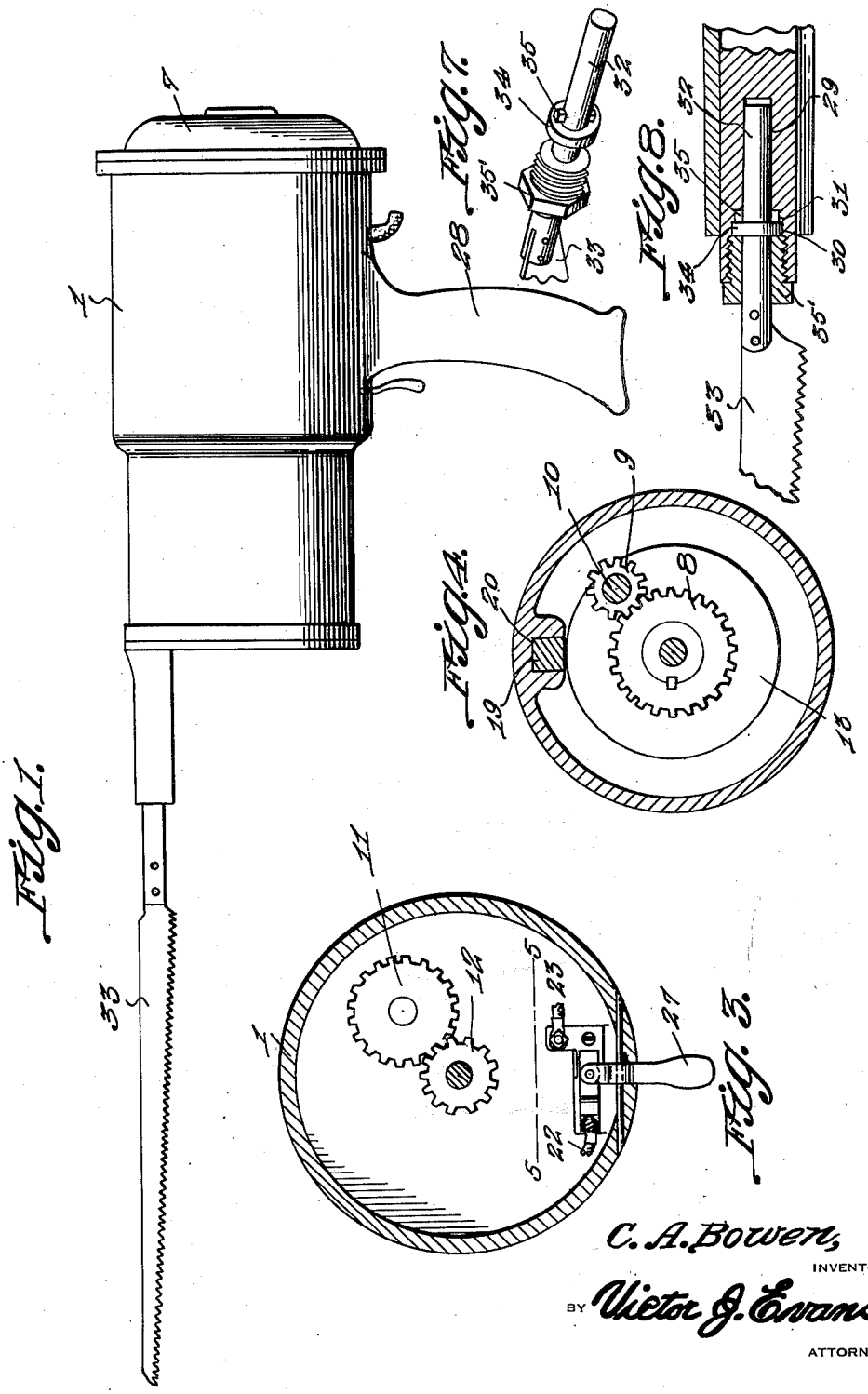

June 10, 1930.  C. A. BOWEN  1,763,500
SAW
Filed Oct. 31, 1927  2 Sheets-Sheet 2
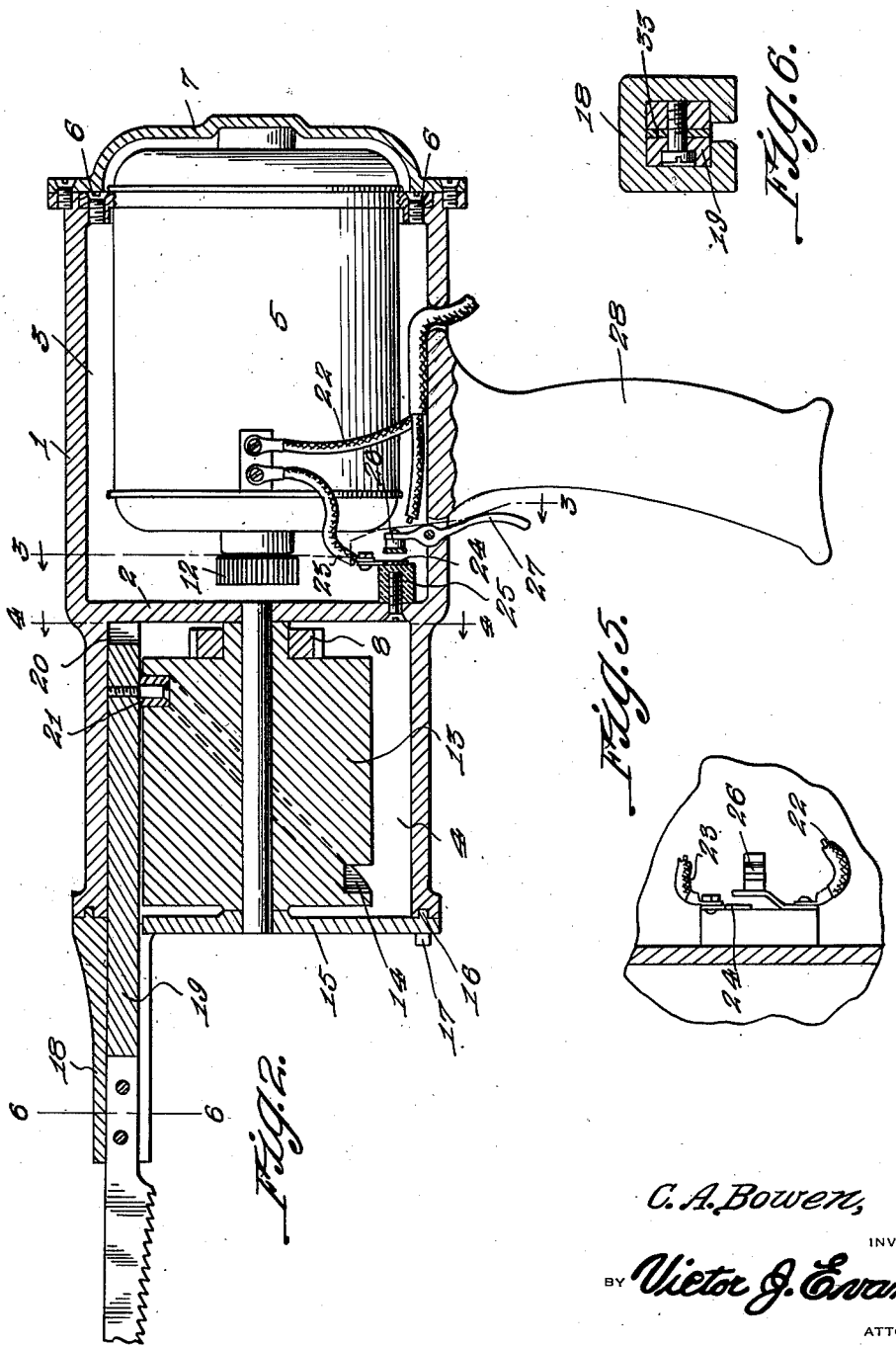
C. A. Bowen,
INVENTOR
BY Victor J. Evans
ATTORNEY Patented June 10, 1930

1,763,500

UNITED STATES PATENT OFFICE

CHARLES ANTHONY BOWEN, OF PORTSMOUTH, OHIO

SAW

Application filed October 31, 1927. Serial No. 230,043.

My present invention has reference to a motor operated portable saw, that is primarily designed for use in making circular cuts, and my object is the provision of a device for this purpose which shall be at all times under the control of the operator and which shall embody a simple, comparatively cheaply constructed device that may be easily manufactured and cheaply marketed.

A further object is the provision of a device for this purpose that employs an electric motor housed in a comparatively small casing, and which is provided with a handle, the shaft of the motor operating a rotary drum which imparts the reciprocatory movement to a plunger rod to which the saw is attached, the motor being operated by a switch arranged adjacent to the handle, and the gearing between the motor and the piston being such as to cause a comparatively rapid turning of the drum and consequently a rapid reciprocatory movement to the plunger rod which carries the saw.

A further object is the provision of a device for this purpose in which a novel clutch means is provided for attaching the saw to the reciprocatory plunger rod.

To the attainment of the foregoing and other objects which will present themselves as the nature of the invention is better understood, the improvement further resides in certain other novel features of construction, combination and operative association of parts, one satisfactory embodiment of which is disclosed by the accompanying drawings.

In the drawings:

Figure 1 is a side elevation of the improvement.

Figure 2 is a substantially central vertical longitudinal sectional view therethrough.

Figure 3 is a sectional view on the line 3—3 of Figure 2.

Figure 4 is a sectional view on the line 4—4 of Figure 2.

Figure 5 is a sectional view approximately on the line 5—5 of Figure 3.

Figure 6 is a sectional view on the line 6—6 of Figure 2.

Figure 7 is a detail perspective view illustrating a modified form of connecting means between the saw and the plunger rod.

Figure 8 is a detail sectional view to show the manner in which the shank of the saw is connected with the plunger rod as shown in Figure 7.

As disclosed by the drawings, my improvement contemplates the employment of a casing 1. This casing is of cylindrical formation and is centrally divided by a partition 2 into compartments 3 and 4. In the compartment 3 there is seated a motor 5 of the ordinary electric driven type. The motor has its outer head formed with a flange that is designed to contact with an inwardly directed flange in the compartment 3 and to be secured thereto by means 6. A cap or cover plate 7 closes the open end of the compartment 3.

The shaft for the motor 5 has fixed thereon a toothed wheel 12 which is in mesh with a gear 11 whose shaft 10 is journaled through the partition 2. On the shaft 10 there is fixed a toothed wheel 9 which is in mesh with a gear 8 secured on the hub of a cam drum 13 that is mounted for rotation on a shaft as shown. The drum is in the nature of a cylindrical block and is formed on its periphery with a continuous elliptical groove 14.

The open end of the compartment 4 is closed by a cover plate 15. This plate is in the nature of a disc and has an inwardly projected continuous rib 16 which is received in the groove in the outer end wall of the compartment 4. A suitable removable securing means 17 attaches the disc or plate 15 to the casing 1.

The disc or closure plate 15 is integrally formed with an outwardly directed substantially rectangular portion 18 that provides a guide for a cross sectional rectangular plunger rod 19. The plunger rod as shown in Figures 1 and 2 has riveted or otherwise secured thereto a saw blade 33 and is received in a suitable guide groove 20 in the compartment 4, the said plunger rod having revolubly supported thereon a roller 21 that is received in the continuous elliptical groove 14 in the drum 13.

Suitably encased wires designed to be connected to a house wiring system or any suitable source of electric energy are directed into the compartment 3. One of these wires which is indicated by the numeral 22 is connected to the contact of the motor as shown, and to the source of electric energy respectively, and a wire 23 is connected with a contact 24 secured on an insulating plug 25 that is fixed on the partition 2, and the wire 23 is also connected to the motor contact. A wire 22' is connected with a second contact on the plug 25 and this contact is in the form of a leaf spring normally disposed out of engagement with the other plug contact but is movable into engagement therewith for closing the circuit by a contact maker 26 which includes a pivotally supported trigger 27 that passes through an opening in the casing 1 and is disposed opposite a handle 28 which is integrally formed with said casing 1.

In the modified form of connecting means for the saw and the plunger rod as shown in Figures 7 and 8, the outer end of the plunger rod 19 is formed with a bore 29 and with a depression 30 that communicates with the said bore. The inner wall provided by the depression is formed with notches 31. The bore 29 is designed to receive therein a shank 32 on whose outer end there is fixed the saw blade 33. The shank carries an annular flange 34 to be received in the depression 30 and lugs 35 to be received in the notches 31. The plunger rod 19, has slidably mounted thereon and surrounding the same a threaded sleeve nut 35' that is threadedly received by threads in the depression 30, as shown in Figure 8 for securing the shank 32 in the bore 29.

The simplicity of my construction and the advantages thereof will, it is thought, be understood and appreciated by those skilled in the art to which such invention relates when the foregoing description has been carefully read in connection with the accompanying drawings. It is, of course, to be understood that saw blades of different types may be readily secured on the plunger rod 19. Obviously by grasping the handle 28 and pressing the trigger 27 the current from the source of supply will flow to the motor 5, causing the shaft of the same to revolve and thereby through the medium of the intermeshing toothed wheels and gears rotate the piston 13. The antifrictional roller 21, traveling in the elliptical groove 14 of the drum will impart a reciprocatory movement to the piston rod 19 and a like motion to the saw blade 33. The improvement is designed to be constructed of light material so that the same can be conveniently handled by the operator. The parts constituting the improvement are interchangeable and access may be obtained to either of the compartments 3 or 4 of the casing, by simply removing the cover plates 7 or 15.

The shaft for the rotary drum 13 is indicated, in the drawings, by the numeral 36, the same being journaled in the cover plate 15 and in the partition 2 and the said shaft is, of course, splined or otherwise fixed in the central bore or opening of the drum 13.

The foregoing description refers to one satisfactory embodiment of my invention but obviously I do not wish to be restricted to the precise details herein set forth and consequently hold myself entitled to such changes therefrom as fairly fall within the scope of what I claim.

Having described the invention, I claim:

A saw of the character described comprising a casing, a motor driven plunger rod mounted in said casing for reciprocation and being formed with a bore communicating with a depression at the outer end thereof, a shank mounted in the bore, lugs formed with said shank and being received in notches formed in the depression, a threaded sleeve nut threadedly secured in the depression, a collar on the shank and engageable by the sleeve nut and a saw blade secured to said shank.

In testimony whereof I affix my signature.

CHARLES ANTHONY BOWEN.